United States Patent [19]

Leschek et al.

[11] 3,925,692

[45] Dec. 9, 1975

[54] REPLACEABLE ELEMENT ULTRASONIC FLOWMETER TRANSDUCER

[75] Inventors: Walter C. Leschek; James L. McShane, both of Pittsburgh, Pa.

[73] Assignee: Westinghouse Electric Corporation, Pittsburgh, Pa.

[22] Filed: June 13, 1974

[21] Appl. No.: 479,057

[52] U.S. Cl. .................. 310/8.7; 310/8.2; 310/8.3; 310/9.1; 340/8 RT
[51] Int. Cl.² ......................................... H01L 41/04
[58] Field of Search ............... 310/8.2, 8.3, 8.7, 8.9, 310/9.1–9.4; 73/67.5 R, 71.5 U; 340/8 MM, 8 RT

[56] References Cited
UNITED STATES PATENTS

| | | | |
|---|---|---|---|
| 2,803,129 | 8/1957 | Bradfield | 310/8.2 X |
| 3,427,481 | 2/1969 | Lenahan et al. | 310/8.2 |
| 3,489,932 | 1/1970 | Kopel et al. | 310/8.7 X |
| 3,794,866 | 2/1974 | McElroy et al. | 310/8.7 X |
| 3,798,473 | 3/1974 | Muryama et al. | 310/8.2 X |

FOREIGN PATENTS OR APPLICATIONS 467,981  12/1951  Italy ................................... 310/8.2

*Primary Examiner*—Mark O. Budd
*Attorney, Agent, or Firm*—W. G. Sutcliff

[57] ABSTRACT

An electroacoustic ultrasonic transducer is described which is usable under high pressure and high temperature operating conditions, and is readily replaceable. A piezoelectric transducer element is disposed within a metallic housing and coupled to a metallic acoustic window which is exposed to the sensed acoustic medium, with very efficient acoustic coupling between the piezoelectric element, the acoustic window, and a damping block disposed behind the piezoelectric element.

2 Claims, 2 Drawing Figures

REPLACEABLE ELEMENT ULTRASONIC FLOWMETER TRANSDUCER

BACKGROUND OF THE INVENTION

The present invention relates to acoustic or ultrasonic transducers, and more particularly to a transducer assembly designed for flowmeter applications. Such electroacoustic transducers have found wide application in the non-destructive testing of material as well as in flowmeter applications.

For flowmeter applications, a pair of such transducers are typically used with each transducer alternately serving as a transmitter and receiver. It is also the common practice to shock excite the transmitting transducer with a voltage pulse and to detect the first or second half cycle of the received ultrasonic wavefront, such a technique being known as leading edge detection. For such a mode of operation, the received wavefront should be sharp and clean, and the ringing of the receiving transducer following its use as a transmitter should decay quickly, so that subsequent arriving wavefronts can be easily detected, It is thus desirable to minimize the mechanical Q of both the piezoelectric transducer element and the acoustic window. The transducer, and in particular its acoustic window, should be structured to detect the arriving ultrasonic signal while reflecting as little energy as possible back into the medium. This is to avoid measurement errors which may arise from sensing of reflected signals, as well as to obtain maximum sensitivity.

When the transducer device is used in a high temperature corrosive fluid medium under high pressure, it is desirable that the acoustic window be made of a high temperature, high strength material which is chemically resistant to attack by the medium.

It is desirable that the piezoelectric element be replaceable in the transducer assembly and that such replacement be effected while the assembly is in position in the fluid medium. It has been the practice to adhesively bond a thin disk of piezoelectric material to an acoustic window in most ultrasonic flowmeter transducer constructions. The adhesive bonding holds the piezoelectric element in place and provides relatively good acoustic coupling between the window and the piezoelectric element, however, the adhesive bond prevents ready replacement of the piezoelectric element. Also, organic adhesive bonds may degrade at elevated temperatures, and the technique of applying metallic adhesive bonds, such as brazing or soldering, may degrade the sensitivity of piezoelectric elements by depoling.

SUMMARY OF THE INVENTION

An acoustic transducer utilizing a readily replaceable piezoelectric element is detailed comprising in part an electrically conductive metal transducer housing, with an acoustically transmissive window portion. A thin disk piezoelectric transducer element is acoustically coupled to the window portion. A tubular insulating sleeve is disposed within the transducer housing adjacent to the tubular interior surface of the housing. An acoustic energy damping block made of electrically conductive material is disposed within the tubular insulating sleeve, which damping block is in electrical contact with and acoustically coupled to the thin disk piezoelectric transducer element. A metal contact is disposed within the tubular insulating sleeve and held in physical and electrical contact with the conductive damping block by a coil spring means disposed within the tubular insulating sleeve. An insulating plate is provided at the end of the tubular insulating sleeve, and holds the coil spring in compression. The insulating plate has an electrical lead-in extending therethrough, with the electrical lead-in electrically connected to the metal contact. A closure member is connectable to the transducer housing to retain the insulating plate within the housing and thereby compress the spring means to press together the metal contact, the damping block, and the piezoelectric transducer element which is pressed against the acoustic window. The interior surface of the acoustic window portion, both surfaces of the piezoelectric disk transducer element, and the end surface of the damping block which contacts the piezoelectric disk transducer element are lapped optically flat, and a liquid acoustic coupling film may be disposed between these mating surfaces to provide effective acoustic coupling therebetween.

The damping block is preferably a solid cylindrical body of electrically conductive graphite which minimizes ringing of the device.

DESCRIPTION OF THE PREFERRED EMBODIMENTS

Figure 1:
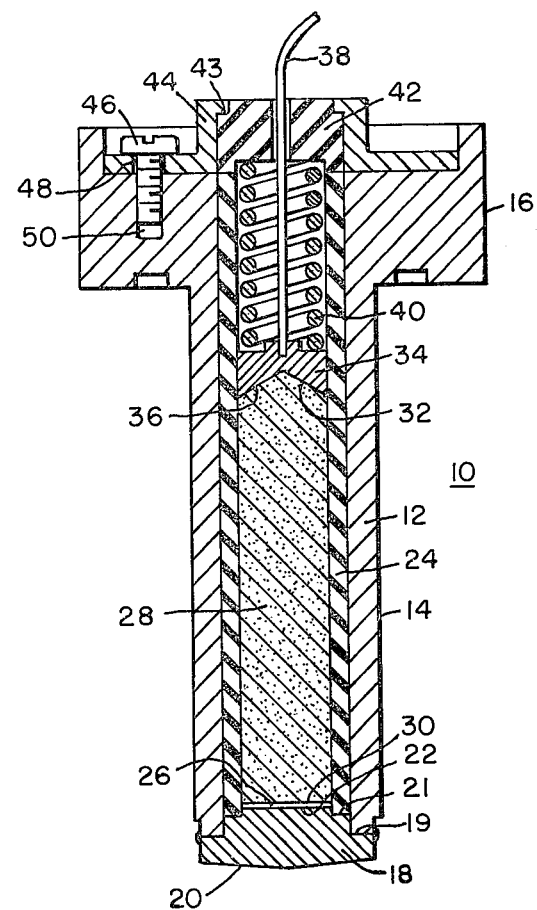
FIG. 1 is a sectional view of the replaceable element transducer assembly of the present invention.

The present invention can best be understood by reference to the exemplary embodiment of FIG. 1. In FIG. 1 the replaceable element transducer assembly 10 comprises an electrically conductive metal transducer housing 12, which is preferably formed of stainless steel. The transducer housing 12 comprises an elongated generally tubular portion 14 with an enlarged diameter portion 16 containing an annular recess at one end thereof. An electrically conductive metal acoustic window 18 is disposed at the end of the tubular portion 14 and sealed thereto preferably by welding. The exterior surface 20 of the window 18 has a good machined finish, and a slight conical taper, while the interior surface 22 is lapped to an optical flatness, typically within ±2 microinches. The acoustic window 18 has annularly stepped portions 19 and 21 which fit respectively the tubular portion 14, to facilitate sealing connection thereto, and the tubular insulating sleeve 24. The acoustic window 18 is also preferably formed of stainless steel. The generally tubular insulating sleeve 24 is disposed within the tubular portion 14 of the transducer housing 12.

A thin disk piezoelectric transducer element 26 is disposed within the insulating sleeve 24 adjacent the interior surface 22 of the acoustic window 18. Both sides of the disk of piezoelectric material are lapped to an optical flatness, typically within ±2 microinches. A lead-zirconate-titanate piezoceramic material has been found to be a very effective piezoelectric material. A rod-like electrically conductive damping block 28 is disposed within the insulating sleeve 24 with an optically flat end portion 30 being in contact with the piezoelectric element 26. The damping block is preferably made of graphite material. The other end 32 of damping block 28 has a generally conically shaped end surface, the shape serving to prevent a strong internal reflection from the end surface. A metallic contact member 34 is disposed within the insulating sleeve and has a cone receiving surface 36 on one side thereof which mates with the conic end 32 of the damping block 28. Electrical lead-in 38 extends from the other side of the contact member 34 and serves as one of the electrical lead-ins for the transducer assembly. A spring member 40 shown as a coil spring is also disposed within the insulating sleeve 24 about the electric lead-in 38 with one end of the coiled spring seating against the contact member 34. An insulating plate member 42 fits over the open end of the insulating sleeve 24 and engages the other end of the coiled spring means 40 when in place. Insulating plate 42 has an annular shoulder portion 43 on the exterior surface side, and a closure plate 44 fits thereover and is connectable to the enlarged diameter end portion 16 of the transducer housing. The closure plate 44 is typically screw fastened in place. A screw 46 passes through aperture 48 in the closure plate 44 and is threadedly engaged in threaded aperture 50 in the end portion 16 of the housing 12. Three such symmetrically spaced screws are utilized.

The electrical lead-in 38 is brought through the insulating plate member 42. The electrically conductive metal transducer housing 12 and window assembly 18 serves as the other electrical connection point for the transducer assembly. A thin film of silicone oil is disposed between the end surface 30 of damping block 28 and the piezoelectric element 26 as well as between the piezoelectric element 26 and the acoustic window 18. This thin film provides an effective acoustic coupling between the mating surfaces. If desired, the silicone oil can be eliminated, and greater mechanical compressive force can be used alone to get good acoustic coupling.

The exterior surface 20 of acoustic window 18 is machined to a slight conical taper which, when two opposing transducers are used in a sensing operation such as a flowmeter, will not substantially reduce the direct received signal, yet will serve to aim acoustic reflections into the fluid away from the other transducer to prevent interference with the direct signal. The angle of the conical surface depends on the distance between transducers, being greater for shorter distances. A 2° taper as shown is suitable for a spacing distance of approximately 3 inches.

A variety of piezoelectric materials which can be used at high temperatures such as lead metaniobate, bismuthstrontium-titanate, or lithium niobate can be used as the piezoelectric material of the piezoelectric element 26. Various other electrically conductive materials can be used for the damping block 28 such as zinc, cadmium, silver, gray iron, and sintered tungsten impregnated with copper, which materials are effective in damping the acoustic energy. The transducer housing may also be hermetically sealed and evacuated or filled with inert gas to extend the range of temperature usage by preventing oxidation at high operating temperatures. Other high temperature liquid, plastic, or metallic acoustic couplants can be used as substitutes for the silicone oil, or dry coupling and high compressive force can be used exclusively. The coiled spring means 40 applies an effective mechanical compressive force to hold together the acoustically coupled surfaces of the damping block, the piezoelectric element and the acoustic window.

Figure 2:
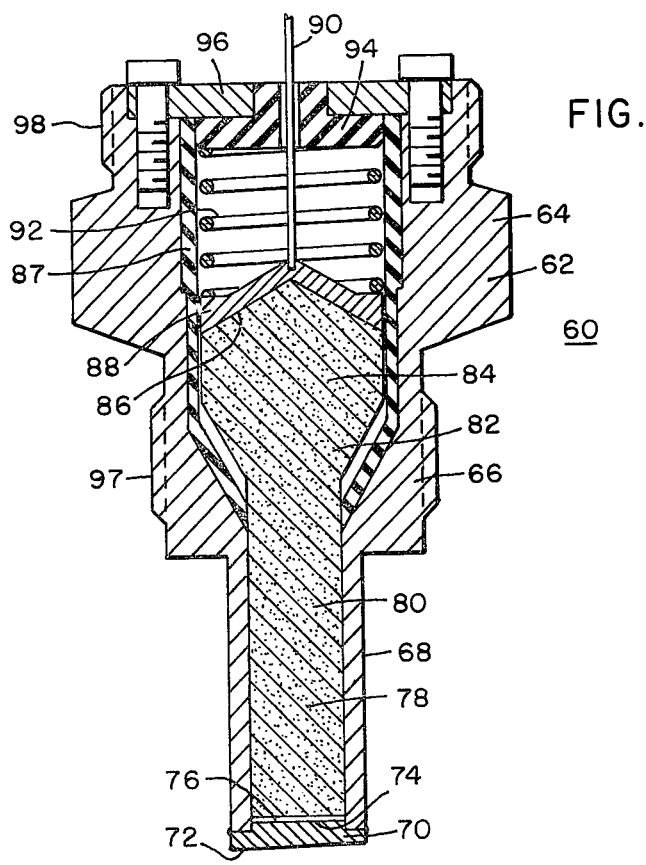
FIG. 2 is a sectional view of an alternate embodiment.

In another embodiment of the present invention seen in FIG. 2, the transducer assembly 60 includes the metallic housing 62, formed of a high temperature resistant and noncorrosive metal such as stainless steel. The housing 62 can be substantially immersed in the fluid and can be semipermanently affixed in place in the pipe section through which the fluid flows. The housing 62 comprises enlarged end 64, intermediate portion 66, and extending tubular end portion 68. A thin disk-like acoustic window 70 is welded in place to close the tubular end portion 68. The exposed face 72 of the acoustic window 70 is preferably machined, after the window is welded in place, to slope the exposed face at a slight angle or to give it a slightly tapered conical surface. This sloping or conical surface permits directive transmission of the acoustic signal while reducing interfering reflections. The interiorly disposed surface 74 of window 70 is lapped before welding to an optical flatness of about ±2 microinches.

A disk-like piezoelectric transducer element 76 fits within the tubular end portion 68. The piezoelectric material is again preferably lead-zirconate-titanate piezoceramic material. Such transducer elements are generally supplied with metallic electrodes deposited on the flat major surfaces of the disk. In lapping the piezoelectric transducer element the electrodes are normally removed; they are not needed because of the efficient electrical coupling of the transducer element to the lapped optically flat conductive surfaces of the window and the damping block 78. The transducer electrodes could be left deposited on the major surfaces of the disk if they were lapped optically flat for good acoustic coupling.

The damping block 78 is formed of an electrically conductive material which has high internal mechanical loss for attenuating or damping acoustic energy. A typical damping block material is zinc or graphite. The damping block 78 has a reduced diameter rod end portion 80, which fits generally within tubular end portion 68. An electrically insulating coating is provided about rod end portion 80 to maintain electrical isolation between rod end portion 80 and the tubular end portion 68. A "Teflon" tape insulation material has been found useful. The backing block has a central transition portion 82, and enlarged diameter end portion 84. The terminal 86 of end portion 84 is generally conic, and a mating cone receiving electrical contact element 88 is abutted thereto. An insulating sleeve 87 is disposed within the enlarged end 64 and intermediate portion 66 of housing 62 to electrically isolate the housing from the backing block 78. An electrical lead-in 90 extends from the contact element 88. A compression spring 92, such as a coil spring, is disposed within the housing 62, one end of the spring contacting the electrical contact element 88, and the other end contacting the electrically insulating plate 94 which acts as a closure member for the insulating sleeve 87. A holding plate 96 fits over the insulating plate 94 and is secured via retaining means, such as screws, to the housing. The electrical lead-in 90 passes through an aperture provided in insulating plate 94.

The end surface of the damping block 78 which abuts the transducer element is lapped optically flat to provide a good acoustic coupling therebetween, with a thin film of fluid couplant therebetween.

The enlarging diameter of the damping block as it proceeds from the acoustically coupled end to the cone shaped end, as well as the provision of a cone shaped end facilitates the damping or attenuating of internally contained acoustic waves by increasing the path length traveled by the waves and by increasing the number of reflections which they must undergo.

The exterior surface 97 of the intermediate housing portion 66 is threaded to permit the assembly to be mounted in place. The enlarged end portion 64 has an externally threaded portion 98, and a generally tubular cover member not shown may be threaded thereon, with an electrical connector provided on the cover member.

It is possible to further adapt the transducer assemblies shown in FIGS. 1 and 2 for specific applications. The acoustic window need not be a simple disk-like member disposed at the end of the housing, but may be an extending rod-like member which provides thermal insulation for the transducer element from a hot fluid. In the same way the window may be joined to a thermal and/or electrical insulator extension. The mating surfaces of these acoustic transmissive members are all lapped optically flat for good acoustic coupling.

It is also possible to dispose a second transducer element abutting the other disk transducer to provide a device which is operable at different frequencies. The mating surfaces between the two transducers are lapped optically flat. The transducers would then be serially electrically connected via the conductive window and backing block. It is also possible to provide a conductive element between two such abutting transducer disks to permit parallel electrical connection.

In summary, the electroacoustic transducer assemblies detailed employ lapped optically flat mating surfaces between the piezoelectric transducer element and the acoustic window and backing block. The liquid film couplant does not degrade the uniform electric field because the film is negligibly thin. For high temperature application, the liquid film couplant may be dispensed with, and compressive dry coupling utilized.

The flatness to which the lapped mating surfaces must be processed depends on the coupling force applied by the spring means and the resonant frequency of the element. When a liquid couplant is used, adequate flatness can be provided by grinding, while an optical flatness is necessary for dry coupling for an element operating at about 5 megahertz.

We claim:

1. An acoustic transducer assembly comprising:
   an electrically conductive, generally tubular metal transducer housing;
   an acoustically transmissive metal window sealingly disposed at one end of the transducer housing, with the exterior and interior surfaces of the metal window being lapped optically flat for optimum acoustic coupling;
   a thin disk, piezoelectric transducer element having opposed surfaces lapped optically flat and one such surface in optical contact with the interior surface of the metal window;
   an insulating sleeve disposed within the generally tubular metal transducer housing;
   a generally cylindrical acoustic wave damping block disposed within the insulating sleeve, which damping block is electrically conductive and has one end surface lapped optically flat and in optical contact with the transducer element disk, while the other end of the damping block has a convex cone shaped terminus;
   an electrical contact member disposed within the insulating sleeve and having a concave conically shaped surface which mates with the damping block convex cone shaped terminus, which contact member is retained in physical and electrical contact with the damping block by a coil spring means disposed within the insulating sleeve;
   an insulating plate provided at one end of the insulating sleeve contacting the coil spring and having an electrical lead-in extending therethrough connected to the contact member, whereby electrical connection is made to the interior surface of the transducer element serially via the electrical contact member and the conductive damping block, with the metal transducer housing serving as another electrical lead to the other side of the transducer element via the metal window;
   a closure member closing the tubular transducer housing and connectable thereto about the insulating plate and contacting the insulating plate to thereby compress the coil spring to compress together the contact member, the damping block, and the transducer element to the metal window.

2. The acoustic transducer assembly specified in claim 1, wherein the generally cylindrical damping block comprises an enlarged diameter end portion which terminates with a convex cone shaped end so that the length of travel of internally reflected acoustic waves is extended.

* * * * *